Figure 1:
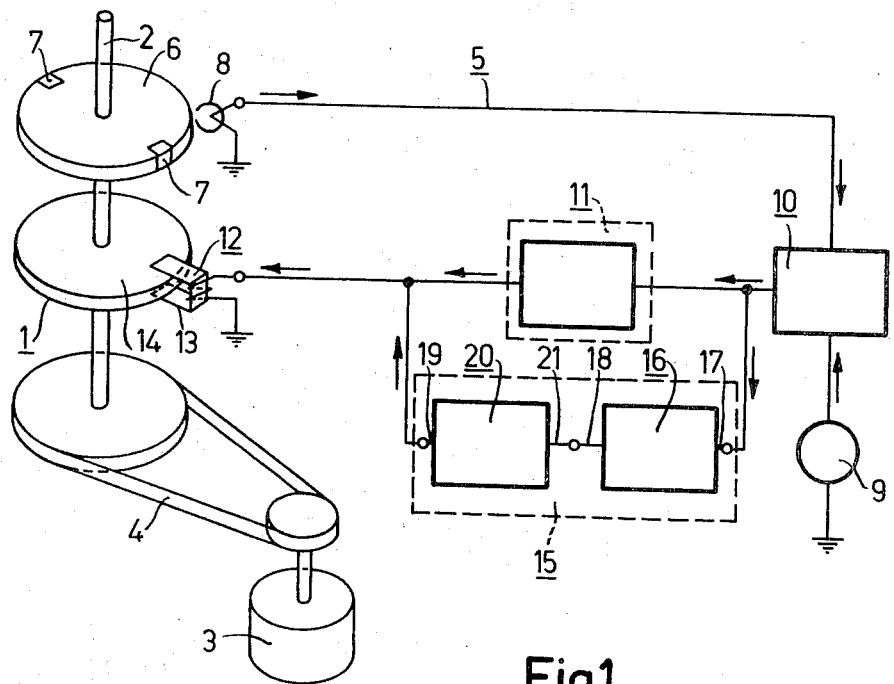

United States Patent [19]
Sommer et al.

[11] 3,873,900
[45] Mar. 25, 1975

[54] SERVO DRIVE FOR A ROTATING SYSTEM

[75] Inventors: Friedrich Sommer, Vienna; Uwe Jahnke, Klosterneuburg, both of Austria

[73] Assignee: U.S. Philips Corporation, New York, N.Y.

[22] Filed: Jan. 7, 1974

[21] Appl. No.: 431,018

Related U.S. Application Data
[63] Continuation of Ser. No. 268,731, July 3, 1972.

[30] Foreign Application Priority Data
July 8, 1971  Austria .............................. 5947/71

[52] U.S. Cl. ................. 318/314, 318/318, 318/327
[51] Int. Cl. .......................... G05b 6/02, H02p 5/50
[58] Field of Search .......... 318/271, 276, 314, 318, 318/327, 369, 397, 398

[56] References Cited
UNITED STATES PATENTS

| | | |
|---|---|---|
| 3,241,023 | 3/1966 | Eby .................................... 318/314 |
| 3,317,806 | 5/1967 | Farinelli ............................. 318/398 |
| 3,344,333 | 9/1967 | Riondel .............................. 318/398 |
| 3,361,949 | 1/1968 | Brown ................................ 318/314 |
| 3,586,946 | 6/1971 | Sadashige .......................... 318/327 |
| 3,657,624 | 4/1972 | Nagano .............................. 318/327 |

*Primary Examiner*—James R. Scott
*Assistant Examiner*—John J. Feldhaus
*Attorney, Agent, or Firm*—Frank R. Trifari; Henry I. Steckler

[57]  ABSTRACT

A control circuit for a rotating object, such as is found in a tape recorder, has two control loops. The first takes the output signal of a phase detector, which is dependent upon a phase difference, between a reference source and the rotating object, and applies it to a speed control means. The second loop converts the phase detector output signal into a signal that is dependent upon a frequency difference and the duration of the frequency difference and applies it to the speed control means.

5 Claims, 3 Drawing Figures

SERVO DRIVE FOR A ROTATING SYSTEM

This is a continuation of application Ser. No. 268,731, filed July 3, 1972.

The invention relates to a servo drive for a rotating system which comprises a phase detector for determining the phase difference between two input signals, namely a measuring signal the frequency of which is representative of the number of revolutions, or speed, of the rotating system and a reference signal the frequency of which is representative of the desired speed, the output signal from the phase detector being applied via a first transmission path as a first control signal to a control device or controlling the speed of the rotating system, whilst this phase detector is of a type in which a sawtooth signal derived from one of the two input signals is sampled at sampling instants which are in synchronism with the other input signal, the sampled values being stored in a store during the time intervals between the sampling instants and becoming available from this source as the output signal of the phase detector.

If in such a servo drive the running-up of the rotating system to the desired speed is to be effected without difficulty, the amplification in the control circuit must be small or the bandwidth of this circuit must be large, for if with a given bandwidth the amplification is large, the system will not simply run up to the desired speed, but undesirable fluctuations about this desired speed (hunting) may occur. However, to enable the desired speed to be accurately maintained after the running-up period, i.e., to permit the desired phase position of the measuring signal with respect to the reference signal to be maintained, it is desirable for the amplification in the control circuit to have a high value at a given bandwidth. Consequently in such servo drives two conflicting requirements are to be satisfied.

It is an object of the present invention to provide a servo drive which enables the desired speed to be maintained with a high degree of accuracy and which at the same time ensures perfect running up to the desired speed. For this purpose the invention is characterized in that the first transmission path is shunted by a second transmission path which comprises at least one differentiator for differentiating the output signal from the phase detector, the output of this differentiator being connected to a summing device in which the successive peak values of the output signals from this differentiator are summed, the resulting sum signal being applied to the control device as a second control signal. The additional control signal for the control device, which is obtained in the second transmission path and is a measure of the frequency difference between the measuring signal and the reference signal and which up to the instant at which frequency equality between the measuring signal and the reference signal is reached continuously increases owing to the summation, causes the system to run up to the desired condition rapidly and surely.

It should be noted that the U.S. Pat. No. 2,551,785 describes a control circuit for automatic frequency synchronization of an oscillator in a television receiver which includes a phase detector for comparing the phase of a desired signal and of an actual signal, which detector controls via a first transmission path a means for adjusting the oscillator frequency, and which furthermore comprises a second transmission path which is connected in parallel with the first transmission path and in which the signal from the phase detector is differentiated. The mean value of this differentiated signal is determined by rectification and filtering and this mean value is applied to the frequency adjusting means as a control signal which is proportional to the frequency difference between the desired signal and the actual signal. These steps provide an improvement of the running-up behaviour of the oscillator, so that it is pulled into synchronisation at a more rapid rate. In a servo drive for a rotating system, however, the described steps are not suitable to achieve a considerable improvement in the running-up behaviour, because in such drives comparatively large masses have to be accelerated and braked, so that quite different circumstances exist for the running-up conditions. Only by the step according to the invention in which the additional control signal for the control device is obtained by adding up the peak values of a signal which is a measure of the frequency difference between the desired signal and the actual signal a really perfect running-up behaviour is obtained in servo drives of the type described, for in the case in which a frequency difference exists for some time the additional control signal will increase, in contradistinction to what is the case in the aforedescribed arrangement, so that the mass inertia of a rotating system to be driven is surely and rapidly overcome.

To obtain a very simple circuit arrangement is has proved of advantage to use two differentiators to the inputs of which the same input signal is applied in the second transmission path and the outputs of which are connected to the summing device via circuit elements which pass signals of opposite polarities.

In order that overdriving in the control circuits be avoided with certainty it has proved of advantage for at least one non-linear circuit element to be provided at the output of the second transmission path to limit the activity of the output voltage of the summing device before it reaches at least one of the two driving limits of the control circuit. With respect to one driving limit this may, for example, be effected by connecting a Zener diode in parallel with the summing device. If on reaching the two driving limits the signal is to be limited, the non-linear circuit element may take the form of, for example, a voltage-dependent resistor. However, to achieve satisfactory limiting properties it has proved of advantage in this connection for the outputs of the two transmission paths to be connected to a first input of an operational amplifier which is provided to feed the control device and to the second input of which are connected a reference voltage source for the control circuit and a threshold value switch which is connected to the summing device and is closed before the driving limits of the operational amplifier and/or of the control device are reached. It has further proved of particular advantage for the second input of the operational amplifier to be also connected to a voltage limiter which when the driving limits of the operational amplifier and/or of the controller have been reached holds the potential at the second input of the operational amplifier at a value which corresponds to the relevent driving limit. Thus the driving range of the control circuits is optimally utilized.

Figure 2:
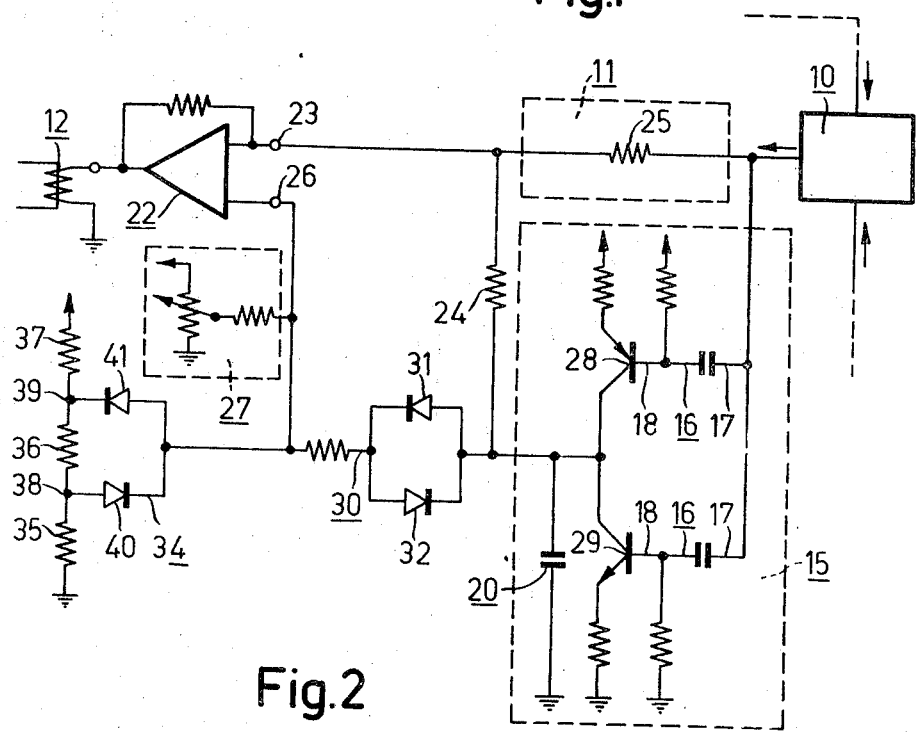
Figure 3:
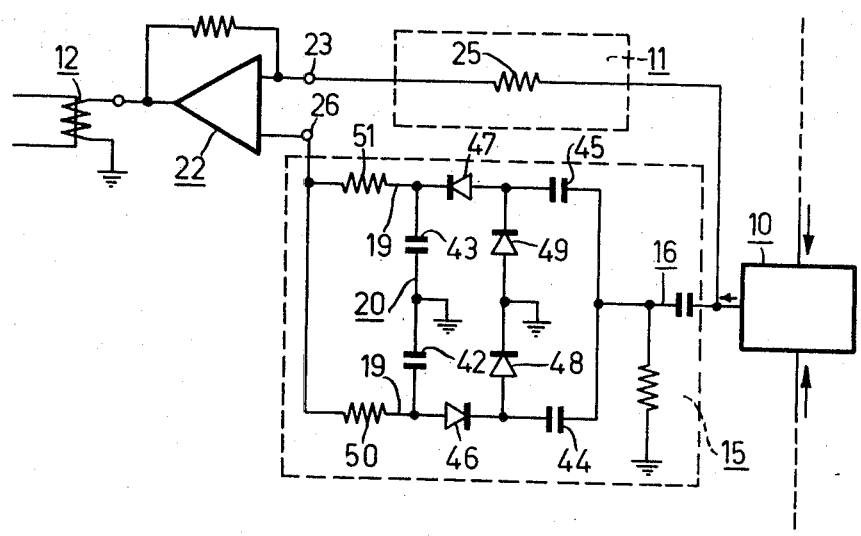

Embodiments of the invention will now be described, by way of example, with reference to the accompanying diagrammatic drawings, in which:

FIG. 1 is a block schematic diagram illustrating the principle of the arrangement according to the invention, FIG. 2 shows an inventively essential part of a particularly advantageous embodiment in which active circuit elements provide the coupling between the differentiator and the summation device, and FIG. 3 shows similarly an embodiment in which this coupling is effected via diodes and the summation device comprises two capacitors.

Referring now to FIG. 1, a rotating system 1 comprises a driving shaft 2, which serves, for example, to drive a record carrier and which is driven by a motor 3 through a belt 4. The speed of the driving shaft is controlled by a servo system 5 which from a comparison of a measuring signal, which is a measure of the actual speed, and a reference signal, which is a measure of the desired speed derives a control quantity for a control device which controls the speed of the system. To provide the measuring signal there is mounted on the driving shaft 2 a disc 6 which is provided at its circumference with, for example, two magnets 7. When the disc rotates, these magnets move past a magnetic head 8 so as to produce pulses therein. The number of pulses per unit of time which comprise this pulse train which forms the measuring signal is a measure of the real speed of the driving shaft. The reference signal is provided by an oscillator 9 having a constant frequency, for example the mains supply. These two signals are compared with each other in a phase detector 10, the measuring signal being converted, for example, into a sawtooth voltage. Such a phase detector is disclosed in U.S. Pat. No. 3,241,023 as element 15 in FIGS. 1 and 2 therein. The output signal from the phase detector is obtained by sampling and storing the sampling value of the sawtooth comparison signal at instants which correspond to a fixed point during each cycle of the reference signal. When there is ffrequency equality between the measuring signal and the reference signal, the said output signal is a direct voltage the value of which is a measure of the relative phase positions of the two signals. If there is no frequency equality between the measuring signal and the reference signal, the output signal from such a phase detector, as is known, is a sawtooth voltage with a frequency equal to the difference between the frequencies of the measuring and reference signal. The latter case occurs, for example, when the system is in the running-up condition. The output signal from the phase detector 10 is applied via a transmission path 11, which may comprise matching elements, filters, amplifiers and the like, to a controller 12 which comprises an eddy-current brake 13 which acts upon a disc 14 which is secured to the driving shaft 2 and by means of which the speed of the rotating system is controlled.

A second transmission path 15 is provided in parallel with the first transmission path 11. This second transmission path includes a differentiator 16 to the input 17 of which the output signal from the phase detector 10 is applied. The output 18 of the differentiator 16 is connected to the input 21 of a summing device 20 the output 19 of which forms the output of the second transmission path and in which the peak values of the output signal from the differentiator are summed.

Because, as has been set out hereinbefore, in the case of frequency equality between the measuring signal and the reference signal the output signal of the phase detector is a direct voltage, in this case the differentiator included in the second transmission path does not deliver a signal, so that this second transmission path does not provide a contribution to the control signal supplied to the controller.

When there is no frequency equality between the measuring signal and the reference signal, which is the case when the system is running up to the desired speed or when it is thrown out of the desired condition owing to a disturbance, the output signal from the phase detector, as has been mentioned hereinbefore, is a sawtooth voltage the frequency of which is equal to the difference frequency. In this case the differentiator 16 delivers an output signal in the form of a pulse train, for during the longer edge of the sawtooth voltage the output signal from the differentiator will be a given comparatively small direct voltage, whilst during the flyback edge a pulsatory voltage having a comparatively large amplitude will be produced. The individual pulses of this signal are added in the summing device 20, the arrangement being such that their peak values are continuously added, so that at the output 19 of the summing device 20 a stepped increasing signal appears, because after each cycle of the sawtooth voltage a peak value of a pulse is added to the sum voltage already present. The absolute value of this output signal is greater as the frequency difference between the measuring signal and the reference signal is larger and as the time which the system requires to reach the desired speed is longer. In accordance with the sign of the frequency difference of the measuring signal with respect to the reference signal, i.e. in accordance with the fact whether the frequency of the measuring signal is higher or lower than that of the reference signal, the pulses supplied by the differentiator 16 are of positive or negative polarity, because the sawtooth output signal from the phase detector which is applied to the differentiator in one case has a flyback edge of negative slope and in the other case a flyback edge of positive slope. This implies that in the summing device also in one case an increasing step voltage and in the other case a decreasing step voltage is built up. When during the running-up period the system overshoots the desired speed, the polarity of the pulses applied to the summing device will also change and the step voltage which, for example, so far has been increasing will decrease, this decrease being stepped also.

Thus there is applied to the controller, via the second transmission path, an additional control signal which depends upon the value of the frequency difference between the measuring signal and the reference signal and also upon the duration of the frequency difference, the stepped increase of this control quantity supplying an effective control command to the system, causing it to run up to the desired condition rapidly and surely, for if the system owing to a large mass should initially run up slowly only, the control signal applied to the controller via the summing device will now rapidly increase, thereby accelerating the rate at which the system is running up.

After frequency equality between the measuring signal and the reference signal has been reached, the summing device 20 does no longer receive pulses, so that the information stored in this summing device in the form of charge will be conducted away in accordance with its discharge time constant. This implies that after the system has run up to its desired condition the second transmission path no longer provides a contribution to the control signal for the controller. However, this is no longer required in this event, because the system is maintained at its desired speed via the first transmission path. In the embodiment shown in FIG. 2 the controller 12 is fed by an operational amplifier 22. Both the first transmission path 11 and the second transmission path 15, the latter via a coupling impedance 24, are connected to the first input 23 of the operational amplifier. In this embodiment the first transmission path 11 comprises only an impedance 25. To the second input 26 of the operational amplifier is connected a reference voltage source 27 with the potential of which the control signals applied to the input 23 of the operational amplifier are compared.

The second transmission path 15 in this embodiment comprises two differentiators 16 which each comprise an RC network and the inputs 17 of which are connected in parallel, the outputs 18 each being connected to the base of a transistor 28 and 29 respectively of opposite conductivity types. The collectors of the two transistors are connected to each other. The summing device 20 in the form of a capacitor is connected to the junction point of the collectors.

In this embodiment also, in operation the two differentiators 16 differentiate the signal from the phase detector 10, either positive or negative pulses being produced in accordance with whether the frequency of the measuring signal is higher or lower than that of the reference signal. When positive pulses are produced, they are transmitted by the transistor 29 to the summing device 20, whereas when negative pulses are produced these are transmitted to the summing device via the transistor 28, for the pulses render the relevant transistor conducting, so that for the duration of the pulse either a charging current is supplied to, or a discharge current is supplied by, the capacitor 20 via the relevant transistor. At the same time summation is performed by the capacitor in that the amount of charge corresponding to each pulse, according to the polarity of the pulse, is either added to, or subtracted from, the charge of the capacitor. Thus there is again produced across the capacitor 20 a step voltage which constitutes a particularly effective additional control signal for the control device, so that the system rapidly and surely runs up to the desired condition.

Because both the operational amplifier and the control device have given driving limits for the positive and negative control signals, overdriving which may disturb the running up of the system to the desired condition is advantageously avoided by connecting a bipolar threshold value switch 30 between the summing device 20 and the second input 26 of the operational amplifier 22, this switch being closed before the two driving limits are reached, so that part of the control quantity supplied by the summing device 20 is also applied to the second input 26 of the operational amplifier. Thus immediately on closure of the threshold value switch 30 both inputs 23 and 26 of the operational amplifier are driven further in accordance with the additional control signal delivered by the summing device, so that owing to the fact that the two inputs of the operational amplifier are in phase opposition this signal does not influence its output signal. In such a case the control signal from the first transmission path 11 only determines the output signal from the operational amplifier. Consequently the effect of the control signal from the second transmission path is restricted to a given driving range of the control circuit; beyond this range it has no effect.

In this embodiment the bipolar threshold value switch 30 simply comprises two diodes 31 and 31 connected in inverse parallel, one or the other of these diodes becoming conductive before the output signal from the summing device reaches the driving limit of the relevant polarity.

To the second input 26 of the operational amplifier there is also connected a bipolar voltage limiter 34 which when the driving limits of the operational amplifier and/or the control device are reached holds the potential at this second input of the operational amplifier at the value which corresponds to the relevant driving limit. This ensures that the potential at the input 26 of the operational amplifier, which potential when the threshold value switch 30 is closed is built up of the reference potential and a corresponding part of the control signal provided by the summing device 20, by itself cannot exceed the driving limits of the operational amplifier, so that always at the input 26 a uniquely defined potential is available as a reference quantity for the signal applied to the input 23.

The bipolar voltage limiter 34 simply comprises a low-resistance voltage divider made up of three resistors 35, 36 and 37, the two tapping points 38 and 39 on this voltage divider being connected to the second input 26 of the operational amplifier via diodes 40 and 41 respectively. The two diodes are connected with opposite polarities, so that according to the polarity of the deviation of the potential at the input 26 from the reference potential set up across the resistor 36 in the direction of one of the two driving limits either one diode or the other becomes conducting, whereupon the potential at the respective tapping 38 or 39 only is applied to the input 26.

The aforedescribed arrangement ensures that such a system rapidly and surely runs up into the desired condition, whilst the driving range of the control circuit is optimally utilized, without being impeded by overdriving of the control circuit.

In the embodiment shown in FIG. 3 also an operational amplifier 22 is provided for controlling the control device. The first transmission path 11 from the phase detector 10 is connected to the first input 23 of the operational amplifier, and the second transmission path 15 is connected to its second input 26, so that the difference between the signals from the two transmission paths determines the driving of the operational amplifier.

The second transmission path 15 comprises a differentiator 16 and a summing device 20 constituted by two capacitors 42 and 43, the capacitor 42 serving to sum the negative pulses delivered by the differentiator 16 and the capacitor 43 serving to sum the positive pulses from this differentiator. The pulses are applied to the capacitors 42 and 43 via coupling capacitors 44 and 45 respectively and diodes 46 and 47 respectively. Diodes 48 and 49 discharge the coupling capacitors 44 and 45 respectively after the pulses have been transmitted. The outputs 19 of the two summing capacitors are connected together via decoupling resistors 50 aand 51 respectively to form a common output for the second transmission path.

The summation of the pulses delivered by the differentiator in the capacitor of the summing device associated with a given polarity of the pulses again causes a step voltage to be built up, which then via the second transmission path acts as an additional control signal for the controller when the frequency of the measuring signal is different from that of the reference signal.

Naturally many modification of the aforedescribed embodiments are possible within the scope of the invention, in particular with respect to the design of the summing device and the manner in which the pulses are applied to this device, whilst the threshold value switch and the voltage limiter also may be differently designed.

What is claimed is:

1. Servo drive for a rotating system which comprises a phase detector for determining the phase difference between first and second input signals, one of said signals comprising a sawtooth signal, means coupled to said phase detector for generating said first input signal, said first signal comprising a measuring signal the frequency of which is representative of the speed of the rotating system, means coupled to said phase detector for generating said second input signal said second signal comprising a reference signal the frequency of which is representative of the desired speed, the output signal from the phase detector being applied, via a first transmission path, as a first control signal to a control device adapted to be coupled to said system for controlling the speed of the rotating system, the phase detector comprising means for sampling said sawtooth signal at sampling instants which are in synchronism with the other input signal and a means for storing the sampled values, said stored values comprising the output signal from the phase detector, a second transmission path shunting said first path, which second path comprises at least one differentiator for differentiating the output signal from the phase detector, the output of this differentiator being connected to a summing device in which the successive peak values of the output signal from this differentiator are summed, the resulting sum signal being applied to the control device as a second control signal.

2. Servo drive as claimed in claim 1, where said second transmission path comprises two differentiators to the inputs of which the same input signal is applied and the outputs of which are connected to the summing device via circuit elements which pass signals of opposite polarities.

3. Servo drive as claimed in claim 1, wherein at the output of the second transmission path there is provided at least one non-linear circuit element for limiting the effect of the output voltage of the summing device before one of the two driving limits of the control circuits is reached.

4. Servo drive as claimed in claim 3, wherein the outputs of the two transmission paths are connected to a first input of an operational amplifier which is provided to feed the control device and the second input of which is connected to a reference voltage source for the control circuit and to a threshold value switch is connected to the summing device and is closed before the driving limits of the operational amplifier and/or the control device are reached.

5. Servo drive as claimed in claim 4, wherein the second input of the operational amplifier is also connected to a voltage limiter which when the driving limits of the operational amplifier and/or the control device are reached holds the potential at the second input of the operational amplifier at the value which corresponds to the relevant driving limit.

* * * * *